United States Patent
Royce, Jr. et al.

[11] 3,804,598
[45] Apr. 16, 1974

[54] PROCESS FOR THE CRYSTALLIZATION OF ALUMINUM NITRATE NONAHYDRATE

[75] Inventors: Damon Vernerd Royce, Jr., Little Rock; Harold Lewis Drown, Benton, both of Ark.

[73] Assignee: Reynolds Metals Company, Richmond, Va.

[22] Filed: Sept. 10, 1971

[21] Appl. No.: 179,512

[52] U.S. Cl. ............... 23/305, 23/301 R, 423/125, 423/395
[51] Int. Cl. ............................................. C01f 7/66
[58] Field of Search .......... 23/305, 301 R; 423/125, 423/395

[56] References Cited
UNITED STATES PATENTS

| | | | |
|---|---|---|---|
| 2,127,504 | 8/1938 | Derr et al. | 423/125 |
| 1,575,634 | 3/1926 | Mejdell et al. | 23/305 |
| 1,413,754 | 4/1922 | Mejdell | 423/125 |
| 3,883,166 | 5/1968 | Gerry et al. | 423/125 |

Primary Examiner—Wilbur L. Bascomb, Jr.
Assistant Examiner—Curtis P. Ribando
Attorney, Agent, or Firm—Glenn, Palmer, Lyne & Gibbs

[57] ABSTRACT

Aluminum nitrate nonahydrate crystals are obtained by crystallization of an impure solution of aluminum nitrate obtained by the nitric acid extraction of an aluminous ore, and which has been substantially freed of its iron content, by providing a slurry of aluminum nitrate nonahydrate crystals in a substantially saturated solution of aluminum nitrate in one or more stages, introducing aluminum nitrate feed solution into said slurry, and removing from the slurry both nonahydrate crystals and excess water in an amount representing the difference between the overall water input to the slurry and the water required to form nonahydrate crystals having an $Al_2O_3$ content corresponding to the $Al_2O_3$ values contained in the feed solution, thereby maintaining a substantially constant volume of slurry and a uniform rate of separation of purer nonahydrate crystals. Additionally, or alternatively, such excess water may be eliminated wholly or partly by preconcentrating the aluminum nitrate solution used in preparing the slurry.

Similarly, the process may be employed for treatment of the mother liquor from which such crystals or other forms of crystalline aluminum nitrate have been recovered, so as to further concentrate impurities while providing partially purified nonahydrate crystals suitable for recycling.

17 Claims, 2 Drawing Figures

FIG. I

PROCESS FOR THE CRYSTALLIZATION OF ALUMINUM NITRATE NONAHYDRATE

CROSS-REFERENCE TO RELATED APPLICATION

This application is a continuation-in-part of application Ser. No. 838,579, filed July 2, 1969, now abandoned.

BACKGROUND OF THE INVENTION

Aluminum nitrate is an industrially important chemical which is marketed mainly in the form of its nonahydrate, $Al(NO_3)_3 \cdot 9H_2O$, as white crystals, soluble in cold water. It is used in textile treatment and leather tanning, and has been proposed as a source of alumina. The aluminum nitrate may be produced by the action of strong nitric acid on aluminum metal, for example, scrap aluminum or aluminum alloys. It may also be produced by treatment of aluminous ores, including clays and bauxite, with nitric acid, in which case the aluminum nitrate is processed further to decompose the material into alumina and to recover the nitric acid.

For aluminum nitrate for any given purpose, the maximum amount of contaminating elements must be held to an acceptable limit, depending upon use specifications. The principal contaminant, iron, may be removed from aluminum nitrate solution by precipitation as iron oxide, or by extraction with organic solvents. This still leaves amounts of potassium and phosphorus in the solution, which may exceed acceptable limits. Aluminum nitrate may be purified by the complex methods of fractional crystallization, as employed for other metal salts, but these are not economical for large scale processing.

GENERAL DESCRIPTION OF THE INVENTION

In accordance with the present invention, there is provided a novel method for the recovery of substantially pure aluminum nitrate, as the nonahydrate, from aqueous solutions of the salt, particularly from substantially iron-free aluminum nitrate solutions obtained by the nitric acid extraction of aluminous ores, such as clays, from which solutions excess iron has been previously removed.

Where the aluminum nitrate is to be thermally decomposed for the production of metallurgical grade alumina suitable for electrolytic reduction to aluminum metal, the specifications for the alumina require that the aluminum nitrate nonahydrate crystals contain not over 0.00067% $K_2O$ and not over 0.00134% $P_2O_5$.

In prior art methods of purifying and crystallizing aluminum nitrate it was considered necessary to employ 70 percent nitric acid as a washing agent for washing the crystalline product at various stages of the sequence, the prevalent view being that this would better serve to eliminate the potash and phosphorus impurities that might be present.

It has been found, surprisingly and unexpectedly, that the separation factor for these impurities is about eight times better when the purification is performed in accordance with the method of the present invention. Such separation factor is expressed as the ratio of the weight percent of the impurity in the crystals to the weight percent of the impurity in the mother liquor. Thus, in the method of the invention, nitric acid use is confined to an initial neutralization of the basicity of the starting aluminum nitrate solution which arises from the presence of excess dissolved alumina therein, so as to attain a stoichiometric solution, i.e., one in which the amount of aluminum present is substantially equivalent to the nitrate present.

The operation of this process will be more readily understood by reference to the accompanying drawing, wherein the process is set forth in flow sheet form. As illustrated, in FIGS. 1 and 2 the process involves at least one crystallization stage, but it will be understood that the number of stages will depend upon the purity of the starting liquor and also upon the degree of purification to be attained.

Further, for purposes of illustration, there is disclosed a purification system in which the feed liquor is an aqueous solution of aluminum nitrate obtained by the extraction of an aluminous ore with nitric acid, which feed liquor has been substantially freed of its iron content, but which exhibits some basicity, that is, it contains excess dissolved alumina. The feed liquor will typically contain about 5% to 10% $Al_2O_3$ by weight. However, $K_2O$ and $P_2O_5$ contamination are both still present.

In order to transform the feed liquor into aluminum nitrate nonahydrate crystals which, upon thermal decomposition, will yield a metallurgical grade of alumina suitable for reduction cell utilization, the liquor may first be subjected to a concentration treatment comprising evaporation under vacuum preferably at about 65°C. However, the temperature may range from about 50°C. to about 80°C. This concentration stage, where used, is carried out in such a way that no crystallization of the aluminum nitrate is allowed to take place, by keeping the solution hot enough to prevent supersaturation. about 30 to 40 percent of the water content is thus removed with no appreciable loss of nitrate.

The essential novel feature of the present invention is the provision of a process for the crystallization of aluminum nitrate hydrate of enhanced purity from an aqueous aluminum nitrate solution, from which the iron content has been substantially removed, and which may also be preconcentrated as described above whereby the purification takes place in a body of a slurry of aluminum nitrate crystals in a substantially saturated solution of aluminum nitrate. Aluminum nitrate feed solution which is to be purified is introduced into this slurry, which is preferably maintained at a substantially constant temperature in the range from about 40°C. to about 70°C. Aluminum nitrate nonahydrate crystals of improved purity are removed from the slurry and there is also removed from the slurry (or eliminated from the solution used in preparing such slurry) any excess water in an amount representing the difference between (1) the overall water input to the slurry, and (2) the water required to form nonahydrate crystals having an $Al_2O_3$ content corresponding to the $Al_2O_3$ values contained in the feed solution introduced into the slurry. In this way there is maintained a substantially constant volume of slurry and a uniform rate of separation of purified aluminum nitrate nonahydrate crystals. Advantageously the water may be removed from the slurry body by evaporation of the aluminum nitrate solution under reduced pressure. Additionally, or alternatively, the aluminum nitrate feed solution can be at least partly freed of its water prior to being introduced into the slurry, and this may be done by evaporation of the feed solution at higher temperature so as to make the solution supersaturated with respect to its dissolved alumina content at the slurry temperature. The feed solution desirably has an alumina content of about 10 percent by weight. It may be introduced into the slurry in a continuous manner, and at a rate corresponding substantially to the rate of removal of crystals from the slurry, based on the respective alumina contents of the feed solution and of the slurry.

The purification method of the invention is advantageously performed in two or more crystallization stages, each of which represents a body of a slurry of aluminum nitrate nonahydrate crystals and substantially saturated aluminum nitrate solution. The first crystallization stage is operated in such a way as to yield a high recovery (as much as 98 percent of the alumina present) of aluminum nitrate nonahydrate crystals which may still contain excessive impurities. The process of the invention is purposely operated so as to obtain a maximum yield of less pure aluminum nitrate crystals from the first stage, and with the intention of bringing down the level of the impurities to the desired level in a second (or, if necessary, a third) crystallization stage. There is purged from the system a small proportion of residual liquor; equivalent to the impurities occurring in the original feed solution. In this way, these impurities are continuously eliminated from the material stream via the waste from the first crystallization stage circuit, and thereby the purification efficiency of the system is maintained at a nearly constant level.

Thus, for example, in operating a two-stage system for the crystallization of aluminum nitrate nonahydrate from aqueous aluminum nitrate feed solution, there are provided first and second crystallization stages, each being a body of a slurry of aluminum nitrate nonahydrate crystals and substantially saturated aluminum nitrate solution. Aluminum nitrate feed solution, substantially free from iron and preconcentrated, if desired, is introduced into the first stage, and excess water is evaporated from the solution in the first stage under reduced pressure at substantially constant temperature in the range from about 40°C. to about 70°C. Partially purified crystals of aluminum nitrate nonahydrate are formed in the first crystallization stage, and are removed, washed, and dissolved in water to form fresh aluminum nitrate solution for introduction into the second crystallization stage. Excess water is then evaporated from the second stage in the same manner as in the first stage. The resulting nonahydrate crystals of higher purity are removed, separated, washed and recovered. Desirably the wash liquor from the post-second stage washing is recycled and used for washing the crystals separated from the first stage. The used wash liquor from the first stage washing is advantageously recycled to the first crystallization stage. Additional water may be introduced into the system for the respective washing operations. In such case, the evaporating load in the first and second stages is adjusted accordingly. Controlled portions of residual mother liquor from the first and second crystallization stages may be recycled respectively to these stages, the balance being discarded to prevent accumulation of impurities in the system.

In the practical operation of the purification process of the invention, an aluminum nitrate solution, for example a solution obtained by the extraction of an aluminous ore with nitric acid, from which all but a trace of iron has been removed, is fed at a constant rate to a stirred vacuum evaporator-crystallizer, operating at substantially constant temperature and pressure. The apparatus is charged with a controlled volume of a slurry of aluminum nitrate nonahydrate crystals in a saturated aluminum nitrate solution. Heat is applied to maintain a rate of evaporation of the water greater than the overall water input rate, less the amount of water required to form nonahydrate crystals. The resulting concentration process tends to supersaturate the aluminum nitrate solution, whereupon further crystallization of nonahydrate takes place.

The nonahydrate crystal slurry is advantageously drawn off continuously at a rate approximately equal in volume to the difference between the aggregate volumetric feed rate and the condensation rate, so that the slurry volume in the evaporator-crystallizer remains substantially constant. The nonahydrate crystal slurry is transferred to a centrifuge where the crystals are separated from the aluminum nitrate solution, and the latter is recycled to the evaporator-crystallizer. If all the separated solution were recycled, all the alumina contained therein would ultimately be recovered as aluminum nitrate nonahydrate, but in such case, all the impurities in the original feed liquor would have been obtained.

Accordingly, a selected portion of the centrifuge recycle solution is withdrawn from the circuit and is discarded, thus providing a means for the rejection of impurities. This purge solution does contain some dissolved alumina, which is lost.

On the other hand, a low purge fraction to reduce alumina losses results in a higher concentration of impurities in the body of liquor in the evaporator-crystallizer, and this, in turn, produces higher impurities in the crystals themselves. Accordingly, it is necessary to strike a balance to achieve the desired degree of purification of the nonahydrate. After centrifuging, the nonahydrate crystals are washed with water to remove soluble impurities, and the washings are recycled to the evaporator-crystallizer.

The foregoing description is characteristic of operation in a single stage crystallization process, in accordance with the invention. In order to avoid the high impurity levels in the first stage crystal product which would result by keeping losses of alumina to the purge liquor at a low figure, it is desirable to perform the overall purification of the aluminum nitrate in two crystallization stages. In this mode of operation, the first stage evaporator-crystallizer is intentionally run at a high recovery rate to produce relatively lower purity crystals, which are then redissolved and recrystallized in a second crystallization stage. The principles of operation of the respective stages are the same, except that in the second stage the purge liquor is not discarded but is returned to the first stage. In this way, overall alumina losses are confined to those occurring in the first stage. This permits adjustment of the rate of the second stage purge to accommodate minor changes in the impurity level of the first stage crystals. If the impurity level of the original feed solution shows moderate to large changes, adjustment of the rate of purge of the first stage can be made, or else additional third or fourth crystallization stages can be added.

As indicated previously, the relationship between the concentration of any particular impurity in the crystals and in the mother liquor is expressed mathematically as the separation factor. This is defined as the ratio of the weight-percent of the impurity in the crystals to the weight percent of the same impurity in the mother liquor. Once the separation factors have been determined, the resultant impurity level in the crystals and liquor can be calculated for any preselected recovery level. It is necessary to determine the separation factors experimentally for each impurity and to make certain that they apply over the range of impurities tested.

DESCRIPTION OF THE PREFERRED EMBODIMENTS

Figure 1:
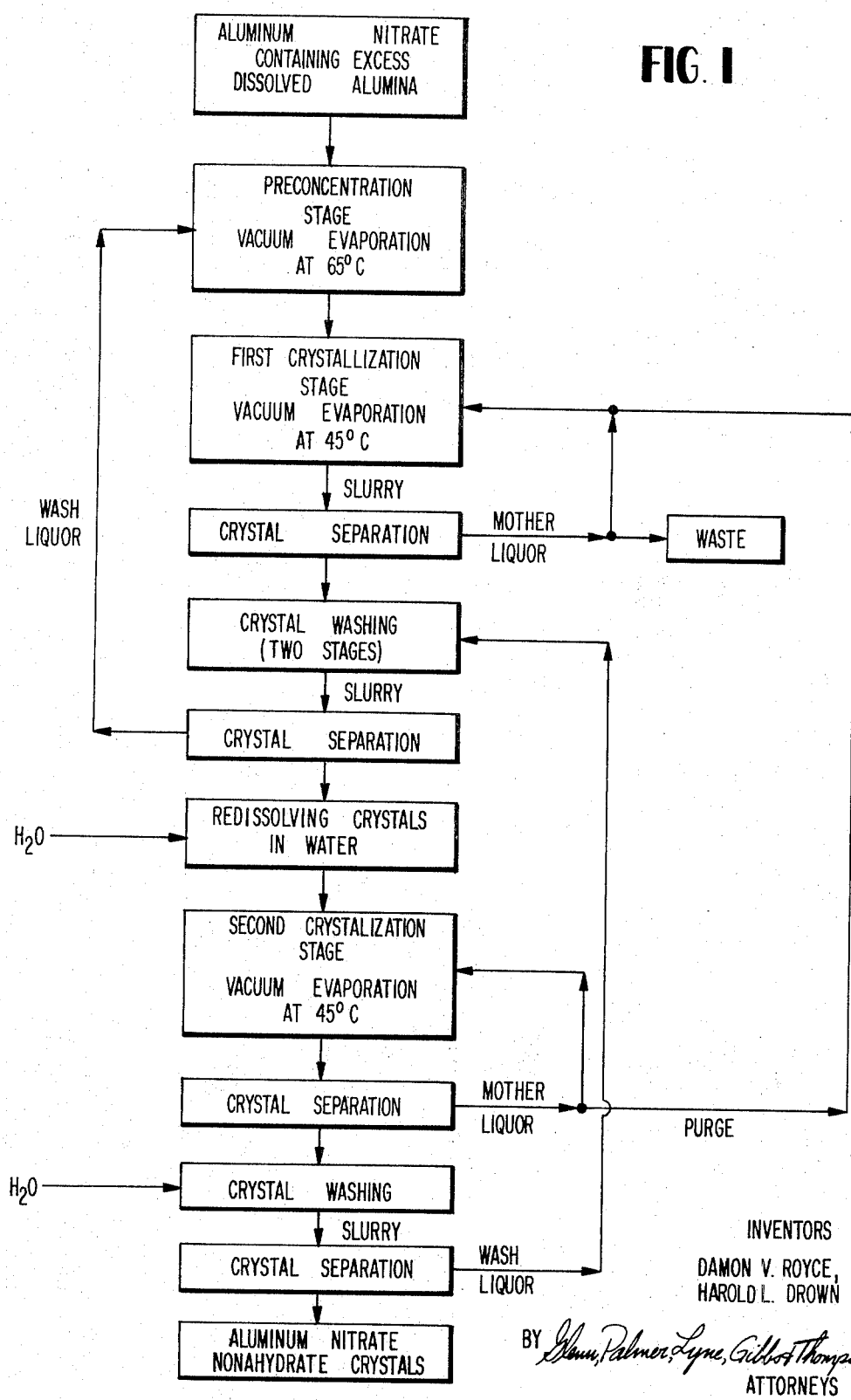
Figure 2:
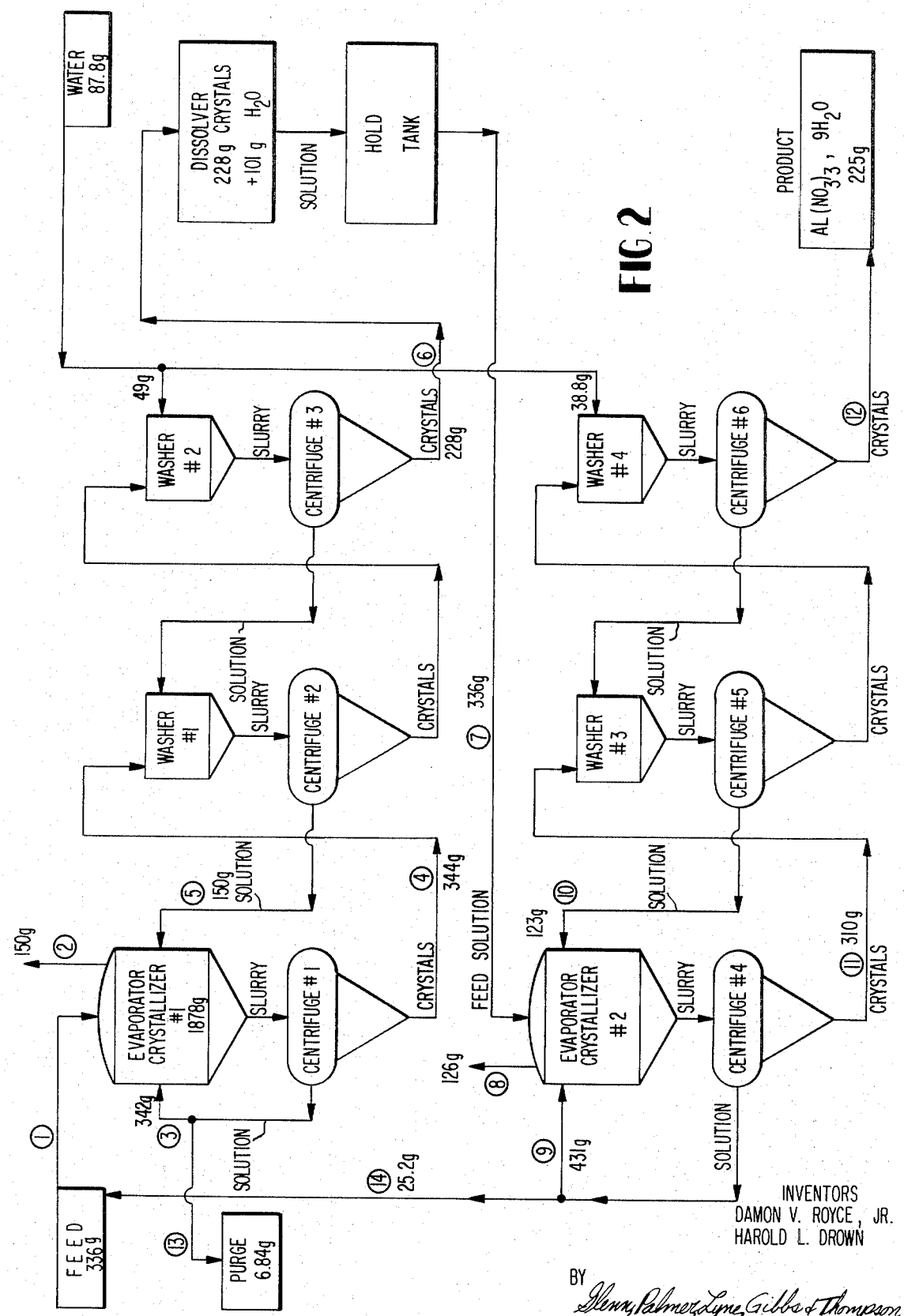

The following example illustrates the practice of the invention, but is not to be regarded as limiting:

EXAMPLE 1

Operating on a laboratory scale, utilizing the two-stage crystallization system described previously, and in a continuous manner, there was used as a starting material an aluminum nitrate solution having the following analysis: $Al_2O_3$ — 8.97%; $NO_3$ — 32.27%; $K_2O$ — 2.35%; $P_2O_5$ — 1.16%; $MgO$ — 0.63%; $SiO_2$ — 0.029%; $Fe_2O_3$ — 0.0009%, all percentages being by weight.

The first crystallization stage was set up by adding 1,878 gm. (1,320 ml) of aluminum nitrate solution to a laboratory crystallizer fitted with an agitator. Vacuum and heat were applied with the agitator running, and the vacuum was adjusted until the temperature at boiling was 45°C. (113°F.), using a mercury manometer fitted with a level detector, which was preset to the desired level. The signal output from the detector was used to open and close a solenoid-operated valve connected to the vacuum source. At 45°C. the vapor pressure of a saturated aluminum nitrate solution is 31.9 mm. mercury. Accordingly, the observed manometer reading and detector setting usually varied between 725 and 730 mm., depending upon barometric pressure. The vapors were condensed in a water cooled condenser at about 15°–16°C. (60°F.). Evaporation by boiling was continued and small amounts of aluminum nitrate nonahydrate crystals were added to initiate crystallization, the point of supersaturation being indicated by profuse crystallization upon further addition of crystals.

Operation of first stage: When the crystallization point was reached, aluminum nitrate feed solution was introduced at a feed rate of 336 gm. per hour. Evaporator concentrate was collected in a standpipe below the condenser, fitted with a liquid level detector, the output of which was connected to an auxiliary portion of the evaporatorcrystallizer heater. An evaporator condensate pump removed condensate at a predetermined rate of 198 gm. per hour. When the level of condensate in the standpipe dropped below the level detector the auxiliary heater was turned on. This increased the evaporation rate until the condensate level in the standpipe rose above the detector, the heater was turned off, the evaporation rate decreased, and the cycling continued to hold the evaporation rate constant.

By adjusting the relative flow rates of feed liquor and condensate while maintaining the volume of the crystallizer constant, the solids present in the crystallizer could be controlled to any desired level, in this instance about 40 percent solids.

At 30 minute intervals a portion of the crystallizer slurry was withdrawn into an evacuated receiving flask, the crystals were separated in a basket centrifuge fitted with a polyester cloth liner, and the centrifugate liquor was returned to the crystallizer, except for a predetermined portion which was removed from the system as an impurity purge. The flow rate of the purge was calculated to contain 2 percent of the $Al_2O_3$ fed. The crystals were removed from the centrifuge and washed with 20 percent of their weight of fresh water in two stages as indicated in the flow sheet of the drawing. Final washings were returned to the crystallizer along with the centrifugate.

Flow rates and analyses of the products are shown in Table 1:

Table 1

| COMPONENT | FEED (Stream) (1) | WASH RETURN (Stream) (5) | Stage I Crystallization Chemical Analyses EVAPORATE (Stream) (2) | PURGE (Stream) (13) | UNWASHED CRYSTALS (Stream) (4) | WASHED CRYSTALS (Stream) (6) | RECYCLE SOLUTION (Stream) (3) |
|---|---|---|---|---|---|---|---|
| % $Al_2O_3$ | 9.96 | 10.00 | — | 10.00 | 13.35 | 13.55 | 10.00 |
| % $NO_3$ | 34.82 | 36.48 | 0.05 | 34.10 | 48.93 | 49.76 | 34.10 |
| % $K_2O$ | 0.068 | 0.44 | — | 3.20 | 0.198 | 0.013 | 3.20 |
| % $P_2O_5$ | 0.013 | 0.18 | — | 1.34 | 0.087 | 0.012 | 1.34 |
| % $MgO$ | 0.0077 | 0.055 | — | 0.40 | 0.025 | 0.0049 | 0.40 |
| % $SiO_2$ | 0.0017 | 0.0004 | — | 0.0036 | 0.0008 | 0.0011 | 0.0036 |
| % $Fe_2O_3$ | 0.0009 | 0.0004 | — | 0.0032 | 0.0003 | 0.0005 | 0.0032 |
| % $CaO$ | 0.001 | 0.0087 | — | 0.064 | 0.0042 | 0.0012 | 0.064 |

| STREAM WEIGHTS | FEED (Stream) (1) | WASH RETURN (Stream) (5) | Flow Rates of Streams (Grams Per Hour) EVAPORATE (Stream) (2) | PURGE (Stream) (13) | UNWASHED CRYSTALS (Stream) (4) | WASHED CRYSTALS (Stream) (6) | RECYCLE SOLUTION (Stream) (3) | WASH WATER |
|---|---|---|---|---|---|---|---|---|
| Total Mass | 336.0 | 150 | 150 | 6.8 | 344 | 228 | 342 | 49 |
| Contained $Al_2O_3$ | 33.5 | 15.0 | — | 0.7 | 45.9 | 30.9 | 34.2 | — |
| Contained $NO_3$ | 117.0 | 54.7 | 0.06 | 2.3 | 168.2 | 117.5 | 116.6 | — |
| Contained $H_2O$ | 196.0 | 86.7 | 150 | 3.8 | 150.7 | 94.2 | 189.9 | 49 |
| Total Contained Impurities | 0.3 | 0.7 | — | 0.3 | 0.8 | 0.08 | 17.4 | — |

Second crystallization Stage: The crystals from the first crystallization stage were redissolved in water to a concentration of 9.9 percent equivalent $Al_2O_3$ content, and were used as feed to the second stage, which was operated in the same manner as the first stage, except that the purge stream was adjusted to contain 7 percent of the feed $Al_2O_3$. The flow rates and analyses of the streams are shown in Table 2:

impurity content may be treated to further concentrate impurities while providing recyclable aluminum nitrate of improved purity.

Accordingly, as an additional illustration of the invention, the mother liquor recovered from a crystallization stage, or the waste stream portion thereof (cf. FIG. 1), may be subjected to further processing as previously described, with the recovered nonahydrate crys- Table 2

| COMPONENT | FEED (Stream) (7) | WASH RETURN (Stream) (10) | Stage II Crystallization Chemical Analyses | | UNWASHED CRYSTALS (Stream) (11) | WASHED CRYSTALS (Stream) (12) | RECYCLE SOLUTION (Stream) (9) |
|---|---|---|---|---|---|---|---|
| | | | EVAPORATE (Stream) (8) | RECYCLE TO STAGE I (Stream) (14) | | | |
| % $Al_2O_3$ | 10.03 | 10.00 | — | 8.84 | 13.30 | 13.35 | 8.84 |
| % $NO_3$ | 37.24 | 36.48 | 0.87 | 34.66 | 48.50 | 49.38 | 34.66 |
| % $K_2O$ | 0.0101 | 0.004 | — | 0.0328 | 0.002 | 0.0002 | 0.0328 |
| % $P_2O_5$ | 0.009 | 0.015 | — | 0.104 | 0.0082 | 0.0022 | 0.104 |
| % MgO | 0.0037 | 0.003 | — | 0.0210 | 0.0014 | 0.0002 | 0.0210 |
| % $SiO_2$ | 0.0008 | 0.0001 | — | 0.0011 | 0.0005 | 0.0006 | 0.0011 |
| % $Fe_2O_3$ | 0.0004 | 0.0002 | — | 0.0014 | 0.001 | 0.0013 | 0.0014 |
| % CaO | 0.0009 | 0.0004 | — | 0.003 | 0.0003 | 0.0001 | 0.003 |

| STREAM WEIGHTS | FEED (Stream) (7) | WASH RETURN (Stream) (10) | Flow Rates of Streams (Grams per Hour) | | UNWASHED CRYSTALS (Stream) (11) | WASHED CRYSTALS (Stream) (12) | RECYCLE SOLUTION (Stream) (9) | WASH WATER |
|---|---|---|---|---|---|---|---|---|
| | | | EVAPORATE (Stream) (8) | RECYCLE TO STAGE I (Stream) (14) | | | | |
| Total Mass | 336 | 123 | 126 | 25.2 | 310 | 225 | 431 | 38.8 |
| Contained $Al_2O_3$ | 33.7 | 11.2 | — | 2.22 | 41.2 | 30.0 | 38.1 | — |
| Contained $NO_3$ | 125.0 | 39.98 | 1.09 | 8.7 | 150.9 | 111.1 | 149.4 | — |
| Contained $H_2O$ | 195.2 | 77.0 | 125 | 15.3 | 134.8 | 97.3 | 260.7 | 38.8 |
| Total Contained Impurities | 0.08 | 0.04 | — | 0.04 | 0.05 | 0.01 | 0.7 | — |

In both crystallization stages, the return solution, as shown in the flow sheet, is the mother liquor. By comparing analyses of mother liquor and washed crystals, the separation factors for the two stages were determined as shown in Table 3:

Table 3

| | SEPARATION FACTORS | |
|---|---|---|
| Impurity | Stage I | Stage II |
| $K_2O$ | 0.004 | 0.006 |
| $P_2O_5$ | 0.008 | 0.021 |
| MgO | 0.012 | 0.009 |
| $SiO_2$ | 0.31 | 0.591 |
| $Fe_2O_3$ | 0.15 | 0.930 |
| CaO | 0.009 | 0.033 |

The purified aluminum nitrate nonahydrate crystals were suitable for the production of reduction cell grade alumina by calcination to drive off $HNO_3$ and to convert the product to alumina.

In addition to the foregoing, it may be noted that the crystallization-purification techniques described above in the context of main stream treatment, i.e., for producing aluminum nitrate nonahydrate crystals and recovering alumina values therefrom, are useful additionally or alternatively in connection with purge stream operations of the type previously mentioned. Thus, in a single or multistage system for the crystallization of aluminum nitrate, whether as nonahydrate or in any other crystalline form, the mother liquor of increased tals then employed for recycling. Such an operation can also be performed in one or more stages, including treatment either of the mother liquor fraction or a partially purified solution derived from the nonahydrate crystals produced in a preceding stage, so that the impurities are further concentrated and ultimately rejected in a purge stream comprising a smaller liquor fraction of still greater impurity content.

We claim:
1. Process for the crystallization of aluminum nitrate nonahydrate from aqueous aluminum nitrate solution, which comprises:
   a. providing a slurry of aluminum nitrate nonahydrate crystals ($Al(NO_3)_3 \cdot 9H_2O$) in a substantially saturated solution of aluminum nitrate and maintaining said slurry at substantially constant temperature in the range from about 40°C to about 70°C;
   b. introducing aluminum nitrate feed solution into said slurry;
   c. removing aluminum nitrate nonahydrate crystals ($Al(NO_3)_3 \cdot 9H_2O$) from the slurry; and
   d. removing water from the slurry or the solution used in preparing said slurry, or both, by evaporation under reduced pressure, so as to eliminate excess water in an amount representing the difference between (i) the overall water input to said slurry and (ii) the water required to form nonahydrate crystals having an $Al_2O_3$ content corresponding to the $Al_2O_3$ values contained in the feed solution introduced into said slurry, thereby maintain- ing a substantially constant volume of slurry and uniform rate of separation of nonahydrate crystals therein.

2. The process of claim 1 in which water is removed from said slurry by evaporation of the aluminum nitrate solution under reduced pressure.

3. The process of claim 1 in which water is at least partly eliminated from the feed solution prior to its being introduced into the slurry.

4. The process of claim 1 in which a portion of the residual mother liquor obtained upon separating the nonahydrate crystals is recycled for incorporation in said slurry.

5. The process of claim 1 in which residual mother liquor obtained upon separating the nonahydrate crystals is treated in like manner to provide partially purified crystals for recycling to said slurry.

6. The process of claim 1 in which the feed solution is concentrated by evaporation at higher temperature so as to be supersaturated with respect to its dissolved alumina content at the temperature of said slurry.

7. The process of claim 1 in which the alumina content of the feed solution is about 10 percent by weight.

8. The process of claim 1 in which said feed solution is introduced continuously.

9. The process of claim 1 in which said feed solution is introduced at a rate corresponding substantially to the rate of removing crystals from said slurry based on the respective alumina content of said solution and slurry.

10. Process for the crystallization of aluminum nitrate nonahydrate from aqueous aluminum nitrate solution which comprises:
  a. providing first and second crystallization stages, maintaining in each stage a slurry of aluminum nitrate nonahydrate crystals (Al $(NO_3)_3 \cdot 9H_2O$) and substantially saturated aluminum nitrate solution;
  b. introducing aluminum nitrate feed solution into the slurry in said first stage;
  c. evaporating excess water from the solution in the first stage under reduced pressure at substantially constant temperature in the range from about 40°C. to about 70°C.;
  d. recovering partially purified crystals of aluminum nitrate nonahydrate (Al$(NO_3)_3 \cdot 9H_2O$) formed in said first stage, washing and dissolving said crystals to form aluminum nitrate solution for introduction into the second stage;
  e. evaporating excess water from said second stage in the manner of step (b); and
  f. removing, separating, washing and recovering nonahydrate crystals (Al$(NO_3)_3 \cdot 9H_2O$) of higher purity from said second stage.

11. The process of claim 10 in which wash liquor from step (f) is recycled for washing the crystals recovered in step (d).

12. The process of claim 10 in which wash liquor from step (d) is recycled to said first crystallization stage.

13. The process of claim 10 in which additional water is introduced for said washing steps; the residual wash liquor is recycled to said crystallization stages; and the evaporation load in steps (c) and (e) is adjusted accordingly.

14. The process of claim 10 in which the crystals recovered in step (d) are dissolved in water.

15. The process of claim 10 in which controlled portions of residual mother liquor and/or wash liquor obtained in steps (d) and (f) are recycled respectively to said first and second crystallization stages, the balance being discarded to prevent accumulation of impurities in the system.

16. The process of claim 10 which includes at least one additional crystallization stage and in which portions of residual mother liquor and/or wash liquor from stages subsequent to said first crystallization stage are recycled to preceding stages in amounts sufficient to permit accumulation of impurities predominantly in said first crystallization stage and the elimination of said impurities in a proportion sufficient to maintain the overall recovery of Al$_2$O$_3$ in the system substantially at a predetermined level.

17. Process for the crystallization of aluminum nitrate nonahydrate from an aqueous aluminum nitrate solution, which comprises:
  a. providing a slurry of aluminum nitrate nonahydrate crystals (Al$(NO_3)_3 \cdot 9H_2O$) in a substantially saturated solution of aluminum nitrate and maintaining said slurry at substantially constant temperature in the range from about 40°C. to about 70°C.;
  b. introducing aluminum nitrate feed solution into said slurry; and
  c. removing from the slurry both nonahydrate crystals (Al$(NO_3)_3 \cdot 9H_2O$) and excess water by evaporation under reduced pressure in an amount representing the difference between (i) the overall water input to said slurry and (ii) the water required to form nonahydrate crystals having an Al$_2$O$_3$ content corresponding to the Al$_2$O$_3$ values contained in the feed solution introduced into said slurry, thereby maintaining a substantially constant volume of slurry and uniform rate of separation of nonahydrate crystals therein.

* * * * *